US011558001B2

(12) United States Patent
Andersen et al.

(10) Patent No.: US 11,558,001 B2
(45) Date of Patent: Jan. 17, 2023

(54) PULSE SHIFT PROTECTION METHOD FOR DETECTING A PHASE-TO-PHASE SHORT CIRCUIT IN A DRIVE AND A DRIVE FOR EXECUTING THE METHOD

(71) Applicant: Danfoss Power Electronics A/S, Gråsten (DK)

(72) Inventors: Henrik Rosendal Andersen, Graasten (DK); Hernan Andres Miranda Delpino, Sønderborg (DK); Per Mærsk Jørgensen, Sønderborg (DK)

(73) Assignee: Danfoss Power Electronics A/S, Gråsten (DK)

( * ) Notice: Subject to any disclaimer, the term of this patent is extended or adjusted under 35 U.S.C. 154(b) by 0 days.

(21) Appl. No.: 17/541,512

(22) Filed: Dec. 3, 2021

(65) Prior Publication Data
US 2022/0182005 A1 Jun. 9, 2022

(30) Foreign Application Priority Data
Dec. 7, 2020 (DE) .......................... 102020132511.8

(51) Int. Cl.
*H02P 29/024* (2016.01)
(52) U.S. Cl.
CPC .................. *H02P 29/024* (2013.01)
(58) Field of Classification Search
CPC ........ H02P 29/024; H02P 27/08; G01R 31/52

USPC .................................................. 318/445, 434
See application file for complete search history.

(56) References Cited

U.S. PATENT DOCUMENTS

| 5,113,489 | A | * | 5/1992 | Cihiwsky | ........... | G05B 23/0272 |
| | | | | | | 358/1.14 |
| 9,716,461 | B2 | * | 7/2017 | Tateda | .................... | H02P 27/06 |
| 10,495,694 | B2 | * | 12/2019 | Jung | .................... | H02H 7/0838 |
| 10,910,832 | B2 | * | 2/2021 | Yoshida | ............... | H02H 7/1257 |
| 11,171,596 | B2 | * | 11/2021 | Kawai | .................... | H02P 29/024 |
| 2020/0228045 | A1 | | 7/2020 | Kawai | | |

FOREIGN PATENT DOCUMENTS

| DE | 102019217747 A1 | 5/2021 |
| JP | 6656488 B1 | 3/2020 |

* cited by examiner

*Primary Examiner* — David Luo
(74) *Attorney, Agent, or Firm* — McCormick, Paulding & Huber PLLC

(57) ABSTRACT

The present invention is directed at a pulse shift protection method for detecting a phase-to-phase short circuit in a drive for controlling electric motors, wherein the drive provides an output voltage to the electric motor, and wherein the instant, at which a short circuit detection function is executed, is chosen to minimize disturbance in the output voltage of the drive. The invention is also directed at a drive for controlling electric motors, said drive including a controlling portion for generating an output signal and an output portion connectable to an electric motor. The drive is provided for executing the above-mentioned pulse shift protection method.

15 Claims, 3 Drawing Sheets

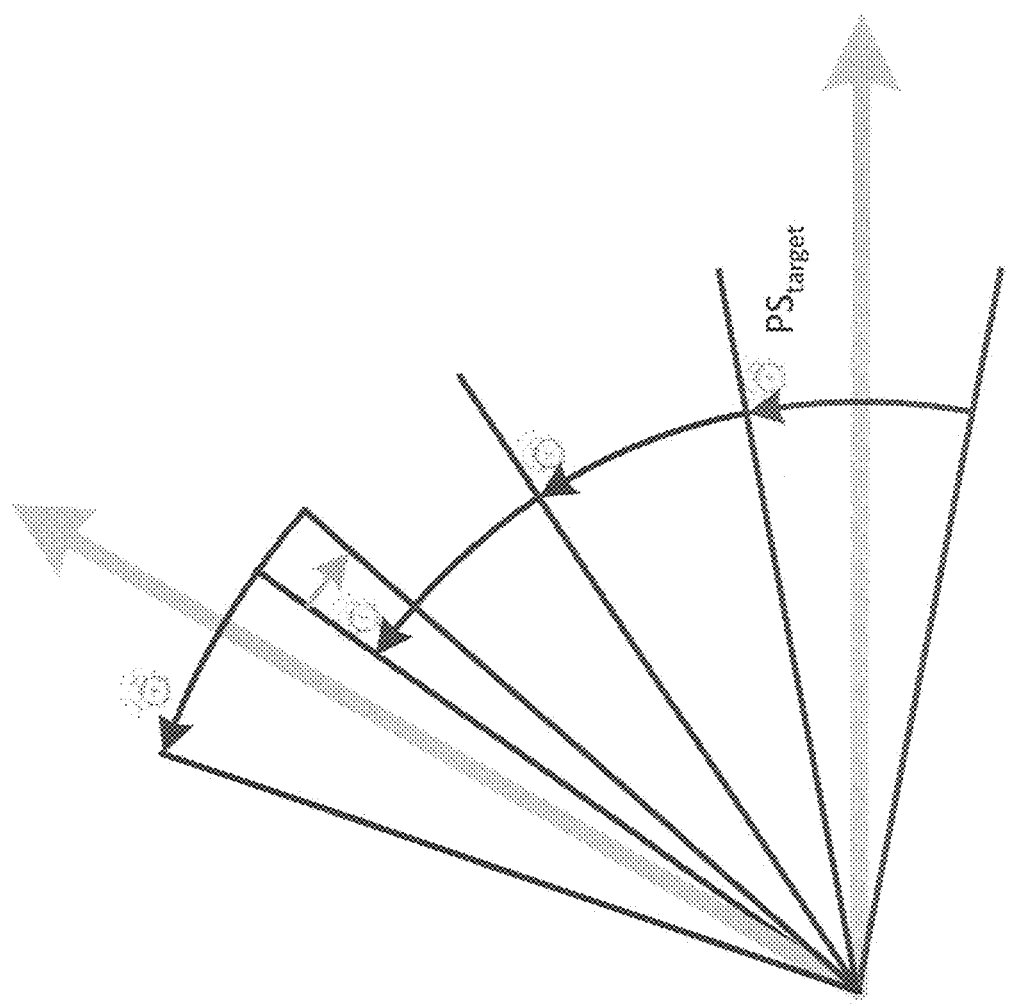

PULSE SHIFT PROTECTION METHOD FOR DETECTING A PHASE-TO-PHASE SHORT CIRCUIT IN A DRIVE AND A DRIVE FOR EXECUTING THE METHOD

CROSS-REFERENCE TO RELATED APPLICATION

This application claims foreign priority benefits under 35 U.S.C. § 119 to German Patent Application No. 102020132511.8 filed on Dec. 7, 2020, the content of which is hereby incorporated by reference in its entirety.

TECHNICAL FIELD

The present invention is directed at a pulse shift protection method for detecting a phase-to-phase short circuit in a drive for controlling electric motors, wherein the drive provides an output voltage to the electric motor, and wherein the instant, at which a short circuit detection function is executed, is chosen to minimize disturbance in the output voltage of the drive. The invention is also directed at a drive for controlling electric motors, said drive comprising a controlling portion for generating an output signal and an output portion connectable to an electric motor. The drive is provided for executing the above-mentioned pulse shift protection method.

BACKGROUND

Drives for controlling electric motors may include various monitoring functions for monitoring the drive and/or the electric motor driven by the drive. The present invention is directed at a method and a device, which allow the detection of short circuits in the context of electric motor drives and the corresponding electric motors.

In order to detect a phase-to-phase short circuit in a three-phase electric power motor it is necessary that a voltage difference between the phases is present. The voltage difference between the two phases will raise a current, which is high enough to enable the detection of a short circuit, should a short circuit be present.

In the present context of electric motor drives and the corresponding electric motors, it is not necessary to ensure that a short circuit is detected as soon as possible. Hence, the function to detect the short circuit may be executed periodically in the range of e.g. milliseconds. Since the function to detect the short circuit may cause changes to the output voltage requested by current controllers of the motor drive, the execution of the short circuit detection may deteriorate the current waveform output by the drive. This in return may affect the motor performance and the motor (parameter) estimation as well as produce undesired acoustic noise.

SUMMARY

Therefore, the goal of the present invention is to optimize the way in which the short circuit detection function is executed, such that the output voltage of the drive is disturbed the least possible.

This goal is achieved by a pulse shift protection method according to claim 1 and a drive according to claim 10, according to which the drive is provided for executing said method. Preferable embodiments of the invention are subject to the dependent claims.

According to the invention, a pulse shift protection method for detecting a phase-to-phase short circuit in a drive for controlling electric motors is provided. The drive provides an output voltage for driving the electric motor. According to the invention, the instant, at which a short circuit detection function is executed, are calculated online. The term "online" presently refers to a state, in which the motor driven by the drive is running. the necessary data, calculations and/or reasoning are performed online. This approach makes it possible to operate at very low speeds of the motor.

The online performed data comprise information corresponding for example to frequencies at which the short circuit detection function is desired to be executed and further comprising information corresponding to the frequency of the motor. The data is than used in calculations for determining the instances at which the short circuit detection function is to be executed.

In order to achieve a minimize disturbance in the output voltage of the drive, the short circuit detection function is executed at instances when the output voltage of the drive is as far as possible form active vectors of the drive.

On the one hand, when the output voltage is as far as possible from the active vectors, significant voltage differences between at least two phases occur naturally. On the other hand, for each active vector there are two phases with equal voltage waveform, where the short circuit detection would be difficult. The present invention makes use of this situation and executes the short circuit detection function at the most favourable moments during the operation of the motor.

The present pulse shift protection method and in particular the short circuit detection function performed by the pulse shift protection method may typically be executed constantly and repetitively while the motor is running. The invention makes it possible to reduce the disturbance on the output voltage generated by the presently described short circuit detection method.

Different motor frequencies may yield different frequencies for executing the pulse shift protection function. Data sets may be stored in a look up table or a database and may comprise the best angles at which the pulse shift protection should be executed. For example, if the motor runs at 300 RPM or 10 Hz and a pulse shift interval of 4 ms is desired, then the pulse shift protection may be executed every 14.4°. The corresponding values may be stored in the look-up table accordingly.

Similar data sets may be provided for any relevant frequency ranges. As an example, for a frequency range of 10-12 Hz, the pulse shift protection may be executed every 14.4°, for a frequency range of 12-15 Hz, the pulse shift protection may be executed every 18°, for a frequency range of 15-20 Hz, the pulse shift protection may be executed every 24° etc.

In another preferable embodiment of the invention, the short circuit detection function is executed at instances, which are determined based on a timer and the instant of the latest execution of the short circuit detection function. This solution may set a timer to indicate the instant at which to perform the pulse shift protection function.

In a particularly preferred embodiment, the timer is reset at every execution of the short circuit detection function. If the timer indicates that a new pulse shift protection should be executed near an active vector, then the pulse shift protection execution is delayed or advanced to a given limit. This may be done by adjusting the value of the counter so that with the updated timer the pulse shift protection is executed at the edge of the vicinity of the active vector. The execution of the short circuit detection function may be delayed or advanced in order to maintain a minimum distance between the execution of the short circuit detection function and an active vector of the drive. The term "distance" may presently refer to a time interval or an angle between the execution of the short circuit detection function and an active vector.

In another preferable embodiment of the invention, the short circuit detection function is executed at instances, which are determined based on a target angle and the angle of the latest execution of the short circuit detection function. If the method is performed for the first time and therefore no angle of the latest or last execution of the short circuit detection function is present, another value may be used instead. This applies to all presently described embodiments.

In the embodiment, the angle at which a pulse shift protection function was executed last may be saved and the next angle at which to perform a new pulse shift protection may be calculated as $$\theta_{next}=\pm\theta_{last}+\omega\times PS_{target}$$

If the next pulse shift protection is to be made near an active vector, the value of $\theta_{last}$ may be modified so that the next pulse shift protection is executed at the edge of the vicinity of the active vector.

The present invention is also directed at a drive for controlling an electric motor, said driving comprising a controlling portion for generating an output signal for controlling the electric motor and an output portion connectable to the electric motor. The drive is provided for executing the above-mentioned pulse shift protection method.

BRIEF DESCRIPTION OF THE DRAWINGS

Further details advantages of the invention are described with reference to the figures. The figures show:

FIG. 3: pulse shift protection in dependence on a timer relative to some active vectors.

DETAILED DESCRIPTION

Figure 1:
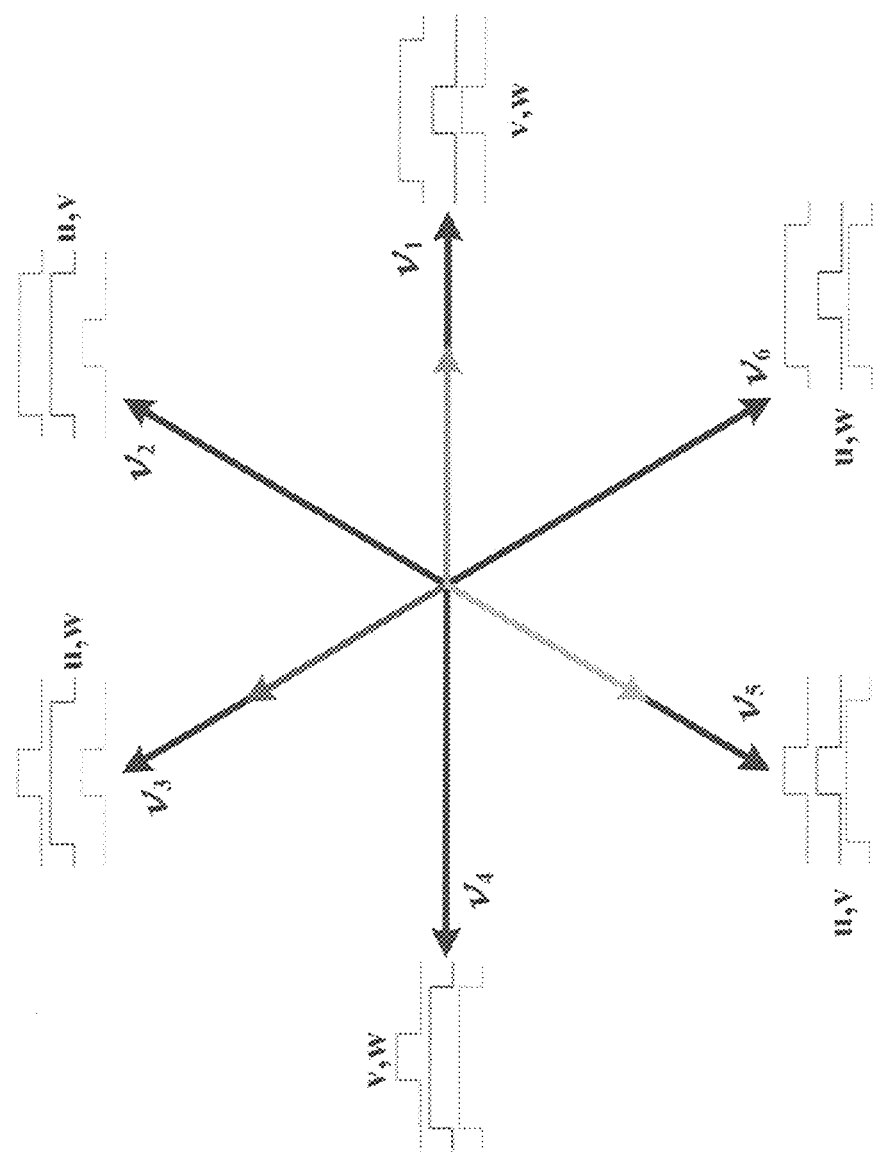
FIG. 1: output voltages for each of the active vectors v1-v6.

FIG. 1 shows output voltages for each of the active vectors v1-v6. The indicated phases v and w for v1, u and v for v2, u and w for v3, v and w for v4, u and v for v5, u and w for v6, have a low voltage difference making it difficult to detect short circuits between these phases.

To detect a phase-to-phase short circuit it is necessary to have a voltage difference between the phases such that it will raise a current high enough to make the detection of the short circuit possible. It is not necessary to ensure that the short circuit is detected as soon as possible. Therefore, the function to detect the short circuit may be executed periodically e.g. in the range of milliseconds.

Since the function makes changes to the output voltage requested by the current controllers the execution of the short circuit detection deteriorates the current waveform, which in return affects the motor performance, the motor estimation and produces undesired acoustic noise. Therefore, the present invention aims at optimizing the instant at which the short circuit detection function is executed to disturb the output voltage the least possible.

The objective is to perform the PSP (Pulse Shift Protection) when the output voltage is as far as possible from the active vectors because there, a significant voltage difference between the phases occurs naturally. FIG. 1 shows that for each active vector there are two phases with equal voltage waveform. For example, in vector 2 (reference output voltage angle is 60°) phases u and v are the same and therefore the short circuit detection is difficult.

The present invention describes different ways for selecting the instant at which the short circuit function detection or pulse shifting protection can be performed by a motor drive. The motor drive may employ only one of these ways or combine two or more of these ways in different operational situation of the drive and/or the motor.

One way of selecting the instant at which the short circuit function detection is performed is based on tables, in particular look-up tables, which may be provided in a memory device of a controller.

Depending on the frequency at which the pulse shift protection function is to be executed and depending on the frequency of the motor, it is possible to store the best angles in the look-up table, at which the PSP should be executed.

Figure 2:
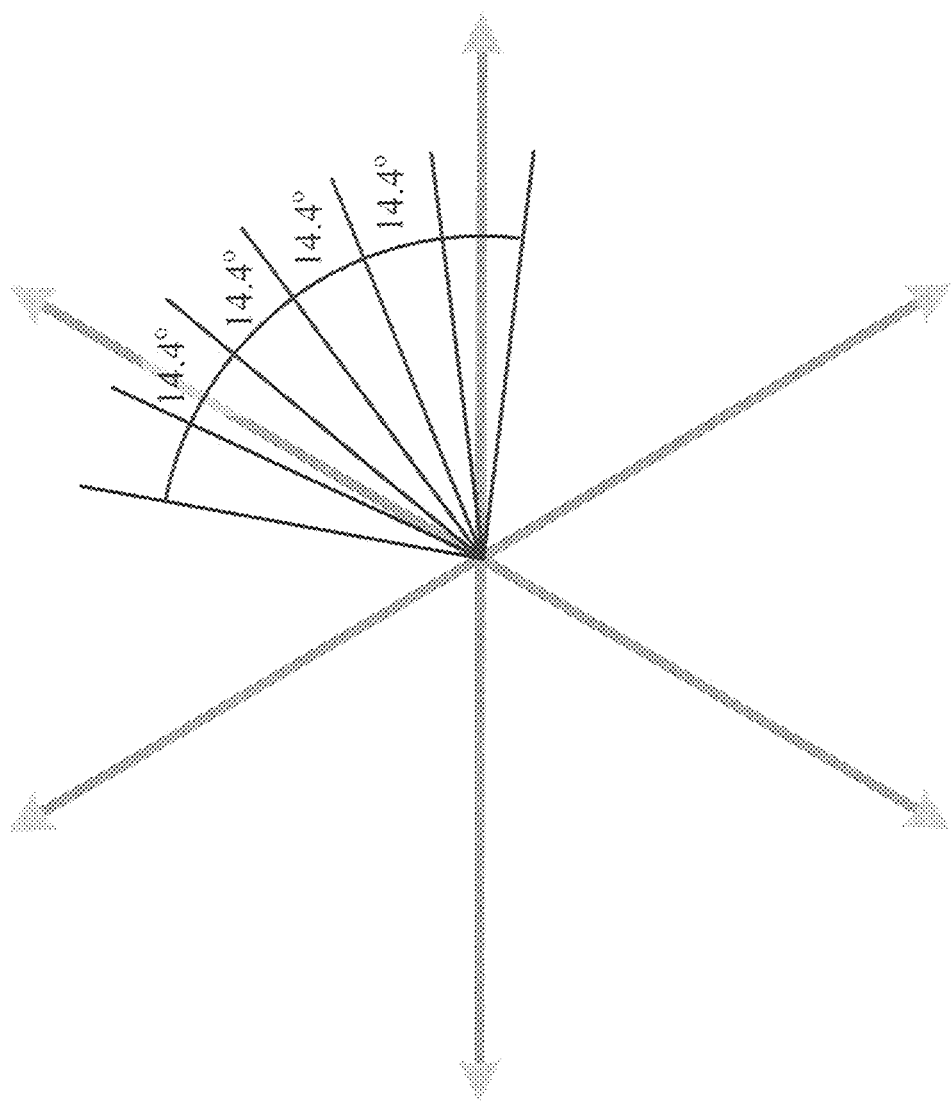
FIG. 2: preferred angles for pulse shift protection relative to active vectors v1-v6.

FIG. 2 shows an example, in which a motor runs at a frequency $Freq_{Motor}$ of e.g. 300 RPM or 10 Hz and a pulse shift interval of 4 ms is desired. As a result, the PSP needs to be executed every PSangle of 14.4°. The corresponding formula used for determining the angles PSangle takes into account the target angle $PS_{target}$ and reads:

$$PSangle=360\times PS_{target}\times Freq_{Motor}$$

Similar calculations may be performed for a number of frequency ranges, for example, for the frequency range of 10-12 Hz, 14.4° may be used, for the frequency range of 12-15 Hz, 18° may be used, for the frequency range of 15-20 Hz, 24° may be used etc.

However, this method presents two problems: First, it is a fixed, static method, so if it is required to change the target period at which the PSP is to be executed, the table needs to be recalculated and corresponding code must be provided. Another issue of this method is that at low speeds of the motor, the angles at which to perform PSP change drastically with small changes in speed. This behaviour results in look-up tables of excessive size and corresponding drawbacks such as high requirements on the hardware of the drive or problems related to excessive and slow controlling processes within the drive.

A similar approach to the one using look-up tables is based on calculating the parameters required for controlling the motor, rather than retrieving them from a look-up table. The calculations and reasoning that would fill the look-up table are performed online, i.e. while the motor is running. This makes it possible to operate the motor at very low speeds but the computations required for conducting this control may be more extensive and heavier than other alternatives.

Another approach for executing the present pulse shift protection method is based on a timer and the instant of the latest or last execution of the pulse shift protection method. This approach is described with reference to FIG. 3.

Here, a timer is sets to indicate the instant at which to perform the PSP function. The timer is reset at every PSP execution. If the timer indicates that a new PSP should be executed near an active vector, then the PSP execution is delayed/advanced to a limit given by $$ActiveVectAngle\pm PS_{target}\times 0.5\times \omega.$$

This is done by adjusting the value of the counter so that with the updated timer the PSP is executed at the edge of the vicinity of the active vector. If the instant falls too close to an active vector, as indicated by the shaded areas close to the active vectors, the timer is reset so that the next PSP occurs at the border of the area.

Yet another approach is based on a target angle and the angle of the latest or last execution of the pulse shift protection method. This approach saves the angle at which a PSP was executed last and calculates the next angle at which to perform a new PSP as $$=\pm\theta_{last}+\omega \times PS_{target}$$

If the next PSP is determined to be made near an active vector, the value of Oust may be modified so that the next PSP is executed at the edge of the vicinity of the active vector.

The invention is not limited to one of the above-described embodiments, but can be modified in many ways.

All of the features and advantages arising from the claims, the description and the drawings, including constructive details, spatial arrangements and procedural steps, can be essential to the invention both individually and in the most varied of combinations.

The invention claimed is:

1. A pulse shift protection method for detecting a phase-to-phase short circuit in a drive for controlling electric motors, wherein the drive provides an output voltage to the electric motor and wherein the instant, at which a short circuit detection function is executed, is chosen to minimize disturbance in the output voltage of the drive, wherein the short circuit detection function is executed at instances, which are calculated online, and wherein the online calculated instances at which to perform the short circuit detection function are calculated so that the output voltage of the drive is as far as possible from active vectors of the drive.

2. The pulse shift protection method according to claim 1, wherein the short circuit detection function is executed at instances, which are determined based on a timer and the instant of the latest execution of the short circuit detection function.

3. The pulse shift protection method according to claim 2, wherein the timer is reset at every execution of the short circuit detection function.

4. The pulse shift protection method according to claim 3, wherein the execution of the short circuit detection function is delayed or advanced in order to maintain a minimum distance between the execution of the short circuit detection function and an active vector of the drive.

5. The pulse shift protection method according to claim 3, wherein the short circuit detection function is executed at instances, which are determined based on a target angle and the angle of the latest execution of the short circuit detection function.

6. The pulse shift protection method according to claim 2, wherein the execution of the short circuit detection function is delayed or advanced in order to maintain a minimum distance between the execution of the short circuit detection function and an active vector of the drive.

7. The pulse shift protection method according to claim 2, wherein the short circuit detection function is executed at instances, which are determined based on a target angle and the angle of the latest execution of the short circuit detection function.

8. The pulse shift protection method according to claim 1, wherein the execution of the short circuit detection function is delayed or advanced in order to maintain a minimum distance between the execution of the short circuit detection function and an active vector of the drive.

9. The pulse shift protection method according to claim 8, wherein the short circuit detection function is executed at instances, which are determined based on a target angle and the angle of the latest execution of the short circuit detection function.

10. The pulse shift protection method according to claim 1, wherein the short circuit detection function is executed at instances, which are determined based on a target angle and the angle of the latest execution of the short circuit detection function.

11. The pulse shift protection method according to claim 10, wherein if the short circuit detection function is executed near an active vector, the value of $\theta_{next}$ is modified so that the next short circuit detection function is executed further away from the active vector.

12. A drive for controlling an electric motor, said driving comprising a controlling portion for generating an output signal and an output portion connectable to the electric motor, wherein the drive is provided for executing the pulse shift protection method according to claim 1.

13. A pulse shift protection method for detecting a phase-to-phase short circuit in a drive for controlling electric motors, wherein the drive provides an output voltage to the electric motor and wherein the instant, at which a short circuit detection function is executed, is chosen to minimize disturbance in the output voltage of the drive, wherein the short circuit detection function is executed at instances, which are calculated online, wherein the short circuit detection function is executed at instances, which are determined based on a timer and the instant of the latest execution of the short circuit detection function.

14. A pulse shift protection method for detecting a phase-to-phase short circuit in a drive for controlling electric motors, wherein the drive provides an output voltage to the electric motor and wherein the instant, at which a short circuit detection function is executed, is chosen to minimize disturbance in the output voltage of the drive, wherein the short circuit detection function is executed at instances, which are calculated online, wherein the execution of the short circuit detection function is delayed or advanced in order to maintain a minimum distance between the execution of the short circuit detection function and an active vector of the drive.

15. A pulse shift protection method for detecting a phase-to-phase short circuit in a drive for controlling electric motors, wherein the drive provides an output voltage to the electric motor and wherein the instant, at which a short circuit detection function is executed, is chosen to minimize disturbance in the output voltage of the drive, wherein the short circuit detection function is executed at instances, which are calculated online, wherein the short circuit detection function is executed at instances, which are determined based on a target angle and the angle of the latest execution of the short circuit detection function.

* * * * *